UNITED STATES PATENT OFFICE.

CHARLES H. FREYER, OF LADDONIA, MISSOURI.

BAIT FOR CATCHING ANIMALS AND THE LIKE.

1,006,841.
No Drawing.

Specification of Letters Patent. Patented Oct. 24, 1911.
Application filed October 12, 1910. Serial No. 586,668.

*To all whom it may concern:*

Be it known that I, CHARLES H. FREYER, a citizen of the United States, and a resident of Laddonia, in the county of Audrain and State of Missouri, have invented a new and Improved Composition of Matter to be Used as a Bait for Catching Animals and the Like, of which the following is a full, clear, and exact description.

My composition consists of the following ingredients, combined in the proportions stated:

Powdered asafetida __ three parts.
Fish oil _____ two parts.
Goose oil _____ one part.

These ingredients are to be thoroughly mingled by agitation.

In the use of the above-mentioned composition, the same can be used in connection with any common animal bait, such as meat and the like, or the composition can be used alone. When used in conjunction with animal traps, the composition serves to attract the animal to the trap and in this manner presents an efficient and easily prepared bait.

Having thus described my invention, I claim as new and desire to secure by Letters Patent:

1. The herein described composition of matter, consisting of asafetida, fish oil and goose oil, substantially as described and for the purpose specified.

2. The herein described composition of matter, for a bait, consisting of powdered asafetida, three parts; fish oil, two parts, and goose oil, one part, substantially as described.

In testimony whereof I have signed my name to this specification in the presence of two subscribing witnesses.

CHARLES H. FREYER.

Witnesses:
 H. P. FRENCH,
 E. P. FRENCH.

Copies of this patent may be obtained for five cents each, by addressing the "Commissioner of Patents, Washington, D. C."